US012716591B2

(12) United States Patent
Cardwell, II et al.

(10) Patent No.: US 12,716,591 B2
(45) Date of Patent: Aug. 25, 2026

(54) COOKTOP APPARATUS AND METHOD OF CLEANING

(71) Applicant: Midea Group Co., Ltd., Beijiao (CN)

(72) Inventors: Charles Cardwell, II, Louisville, KY (US); Richard W. Cowan, Louisville, KY (US); Felix Conde Zelocuatecatl, Louisville, KY (US)

(73) Assignee: MIDEA GROUP CO., LTD., Beijiao (CN)

( * ) Notice: Subject to any disclaimer, the term of this patent is extended or adjusted under 35 U.S.C. 154(b) by 1100 days.

(21) Appl. No.: 17/846,338

(22) Filed: Jun. 22, 2022

(65) Prior Publication Data

US 2023/0417419 A1 Dec. 28, 2023

(51) Int. Cl.

*F24C 14/02* (2006.01)
*F24C 15/00* (2006.01)
*F24C 15/16* (2006.01)
*H05B 3/74* (2006.01)

(52) U.S. Cl.

CPC ............ *F24C 14/02* (2013.01); *F24C 15/007* (2013.01); *F24C 15/16* (2013.01); *H05B 3/74* (2013.01)

(58) Field of Classification Search

CPC ........ F24C 15/007; F24C 15/10; F24C 15/16; H05B 1/0263; H05B 3/74
USPC .......................................................... 219/405
See application file for complete search history.

(56) References Cited

U.S. PATENT DOCUMENTS 3,632,983 A * 1/1972 Dills ..................... F24C 15/108 219/465.1
4,493,976 A * 1/1985 Wilson ..................... F24C 14/02 126/21 R
5,438,180 A * 8/1995 Eisenbrandt ............ F24C 7/085 219/508
5,530,224 A 6/1996 Sassman
6,399,924 B1 6/2002 Cai
D464,845 S 10/2002 Shin
6,752,142 B2 6/2004 Kollner
7,763,832 B2 7/2010 Striegler et al.
8,770,183 B2 7/2014 Iritani et al.
9,731,333 B2 8/2017 Fowler
2009/0044795 A1* 2/2009 Shaffer ................. F24C 15/107 126/211
2017/0247289 A1 8/2017 Waldschmidt et al.
2020/0278120 A1* 9/2020 Neal ....................... F24H 15/14

FOREIGN PATENT DOCUMENTS

DE 102018101319 A1 7/2019
DE 202019003215 U1 9/2019
WO 2010081637 A1 7/2010

OTHER PUBLICATIONS

Lomi, Your Cooktop Apron, retrieved from: https://thecooktopmat.com/; Retrieved on Jun. 22, 2022.

* cited by examiner

*Primary Examiner* — Sang Y Paik
(74) *Attorney, Agent, or Firm* — Gray Ice Higdon

(57) ABSTRACT

One or more cooking elements of a cooking appliance may be controlled during a glass member-clean cycle to maintain a temperature within an oven cavity. One or more covers and/or one or more cooktops may include one or more glass members. The one or more glass members may be positionable between different configurations. The cooking appliance may include one or more stands.

21 Claims, 8 Drawing Sheets

COOKTOP APPARATUS AND METHOD OF CLEANING

BACKGROUND

The present embodiments relate to a cooktop surface, with particular embodiments shown for a cooktop surface of a cooking appliance.

Typical cooktop surfaces may get soiled over time and can be difficult to clean. For example, cooking/food materials (e.g. burnt food or fluid) on the cooktop surfaces may not be able to be cleaned/removed in order to return the cooktop surface back to its satisfactory appearance. Thus, there is a need for a cleanable cooktop surface and/or method of cleaning the cooktop surface for the cooking appliance.

SUMMARY

In some embodiments of the invention, for example, a cooking appliance may include a housing including an oven cavity and one or more electric burners. In various embodiments, the appliance may include one or more glass members positionable between a first configuration wherein the one or more glass members may be disposed over the one or more electric burners and a second configuration wherein the one or more glass members are disposed within the oven cavity. In some embodiments, the appliance may include a temperature sensor configured to sense an air temperature within the oven cavity. In various embodiments, the appliance may include one or more electric cooking elements configured to generate heat within the oven cavity. In various embodiments, the appliance may include a controller in communication with the temperature sensor and configured to control the one or more electric cooking elements to perform a pyrolytic glass member-clean cycle within the oven cavity when the one or more glass members are disposed within the oven cavity in the second configuration.

In addition, in some embodiments, the appliance may include one or more stands, wherein the one or more stands position the one or more glass members in the second configuration within the oven cavity when performing the pyrolytic glass member-clean cycle. In various embodiments, the one or more glass members may be at least a portion of a cooktop in the first configuration. In some embodiments, the appliance may include a cooktop disposed over the one or more electric burners, wherein the one or more glass members may be a cover disposed over the cooktop. In various embodiments, the controller may be configured to perform the pyrolytic glass member-clean cycle by regulating the one or more electric cooking elements to maintain the temperature within the oven cavity proximate a pyrolytic glass member-clean temperature setpoint. In some embodiments, the controller may be configured to control the one or more electric cooking elements to perform an oven self-clean cycle within the oven cavity. In various embodiments, the appliance may include one or more oven racks disposed within the oven cavity, wherein the one or more oven racks are removed from the over cavity when the one or more glass members are in the second configuration. In some embodiments, the one or more glass members may be a ceramic glass. In various embodiments, the one or more glass members may have one or more graphics.

In some embodiments, a cooking appliance may include a housing including an oven cavity and one or more electric burners. In various embodiments, the appliance may include one or more glass members positionable between a first configuration wherein the one or more glass members are disposed over the one or more electric burners and a second configuration wherein the one or more glass members are disposed within the oven cavity. In some embodiments, the appliance may include one or more electric cooking elements configured to generate heat within the oven cavity to clean the one or more glass members when in the second configuration.

In addition, in some embodiments, the appliance may include a controller configured to control the one or more electric cooking elements to perform a pyrolytic glass member-clean cycle within the oven cavity when the one or more glass members are disposed within the oven cavity in the second configuration. In various embodiments, the appliance may include one or more stands spacing the one or more glass members from one or more cavity walls when in the second configuration. In some embodiments, the one or more glass members may be at least one of one or more covers and/or at least a portion of a cooktop. In various embodiments, the appliance may include a self-clean cycle, wherein the self-clean cycle may be different from the pyrolytic glass member-clean cycle. In some embodiments, the appliance may not include a self-clean cycle. In various embodiments, the one or more glass members may be in direct contact with one or more cavity walls. In some embodiments, the one or more glass members may be positioned horizontally on a bottom wall of the one or more cavity walls.

In some embodiments, a method of pyrolytic cleaning one or more glass members disposed over one or more electric burners may include providing one or more glass members in a first configuration disposed over one or more electric burners. In various embodiments, the method may include positioning the one or more glass members in a second configuration in an oven cavity. In some embodiments, the method may include sensing a temperature within the oven cavity of a cooking appliance. In various embodiments, the method may include a controller in communication with a temperature sensor, performing a pyrolytic glass member-clean cycle within the oven cavity when the one or more glass members are disposed within the oven cavity in the second configuration by regulating one or more cooking elements that generate heat within the oven cavity to maintain the temperature within the oven cavity proximate a pyrolytic glass member-clean temperature setpoint.

In addition, in some embodiments, the method may include positioning the one or more glass members on one or more stands within the oven cavity in the second configuration. In various embodiments, the method may include washing the one or more glass members at least one of before and/or after performing the pyrolytic glass member-clean cycle. In some embodiments, the one or more glass members may be one or more covers disposed on at least a portion of a cooktop. In various embodiments, the one or more glass members may be at least a portion of a cooktop. In some embodiments, the method may include uniformly heating the one or more glass members when performing the pyrolytic glass member-clean cycle. In various embodiments, the method may include incinerating cooking material on the one or more glass members when performing the pyrolytic glass member-clean cycle. In various embodiments, the method may include removing one or more oven racks from the oven cavity before positioning the one or more glass members in a second configuration in the oven cavity.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
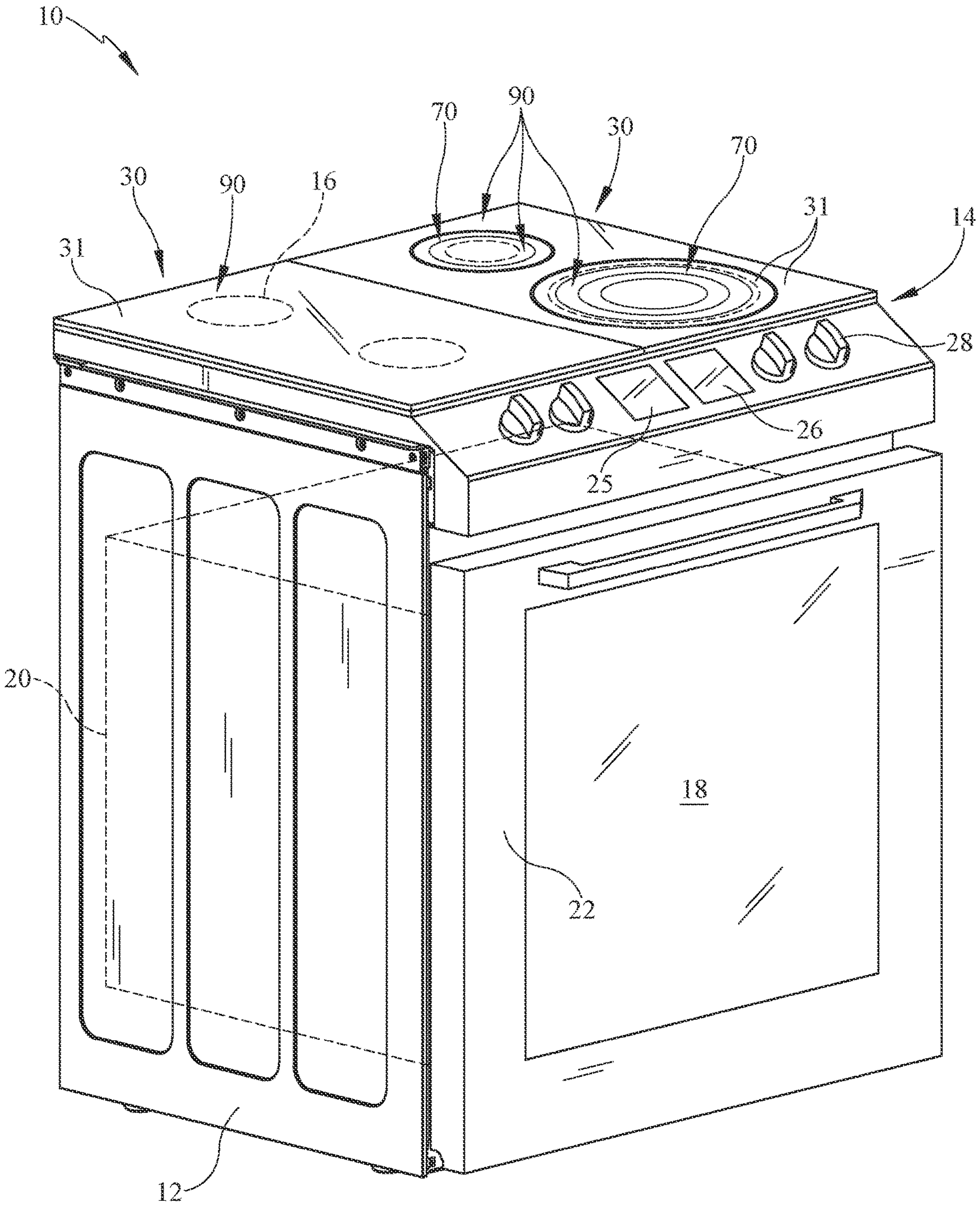
FIG. 1 is a perspective view of a cooking appliance consistent with some embodiments of the invention, illustrating the one or more glass members or covers in a first configuration disposed over one or more radiant burners.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16 (e.g. radiant, electric burners), and an oven 18 defining an oven or cooking cavity 20 accessed via an oven door 22. Cooking appliance 10 may also include a second oven in some embodiments. Various cooking elements 17 (shown in FIG. 7) may also be incorporated into cooking appliance for cooking food in oven 18, e.g., one or more electric cooking or gas heating elements.

Cooking appliance 10 may also include various user interface devices, including, for example, control knobs 28 for controlling burners 16, a control panel 25 for controlling oven 18, glass member clean-cycle, and/or burners 16, and a display 26 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 32 may be touch sensitive to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a cooktop and one or more ovens, and which in some embodiments may be a standalone or drop-in type of range. In other embodiments, however, cooking appliance 10 may be another type of cooking appliance, e.g., a wall mount or freestanding oven. In general, a cooking appliance consistent with the invention may be considered to include any residential-type appliance(s) including a housing and one or more cooking elements disposed therein and configured to generate energy for cooking food within one or more oven cavities and/or a cooktop.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a stovetop, one or more cooking elements therein may be gas, electric, or inductive heating elements in some embodiments. Further, it will be appreciated that any number of cooking elements may be provided in a cooking appliance (including multiple cooking elements for performing different types of cooking cycles such as baking or broiling), and that multiple types of cooking elements may be combined in some embodiments, e.g., combinations of microwave and light cooking elements in some oven embodiments. In the one embodiment shown, the cooktop 14 includes one or more radiant burners (e.g. electric) adjacent thereto and the cooking cavity 20 includes one or more cooking elements 17 such as, but is not limited to, radiant elements (e.g. electric).

Figure 2:
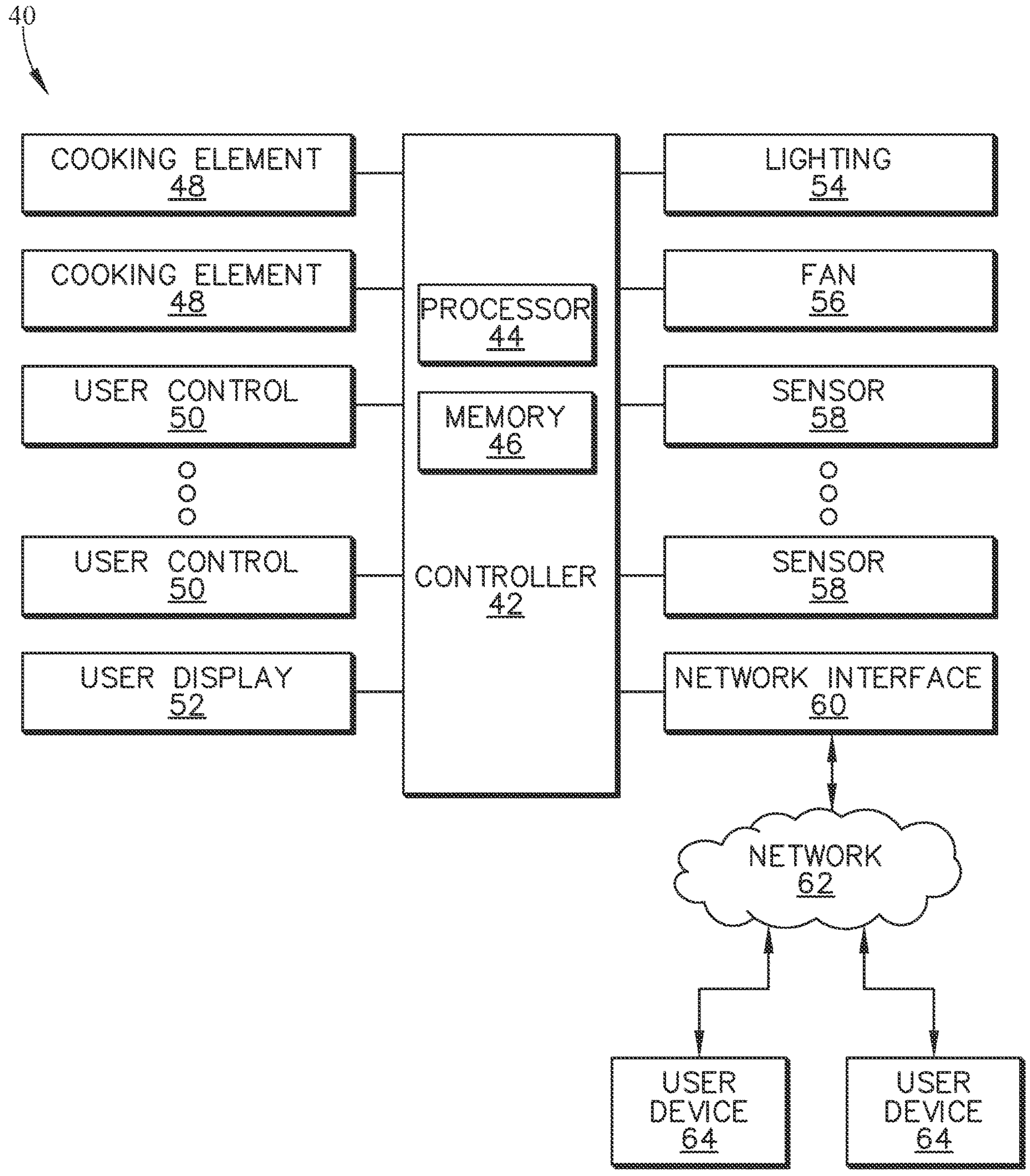
FIG. 2 is a block diagram of an example control system for a cooking appliance consistent with some embodiments of the invention.

A cooking appliance consistent with the invention also generally includes one or more controllers configured to control the cooking elements and otherwise perform cooking operations at the direction of a user. FIG. 2, for example, illustrates an example embodiment of a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments. Sensors 58 may include, for example, one or more temperature sensors for sensing an air temperature within an oven cavity.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used. In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Figure 4:
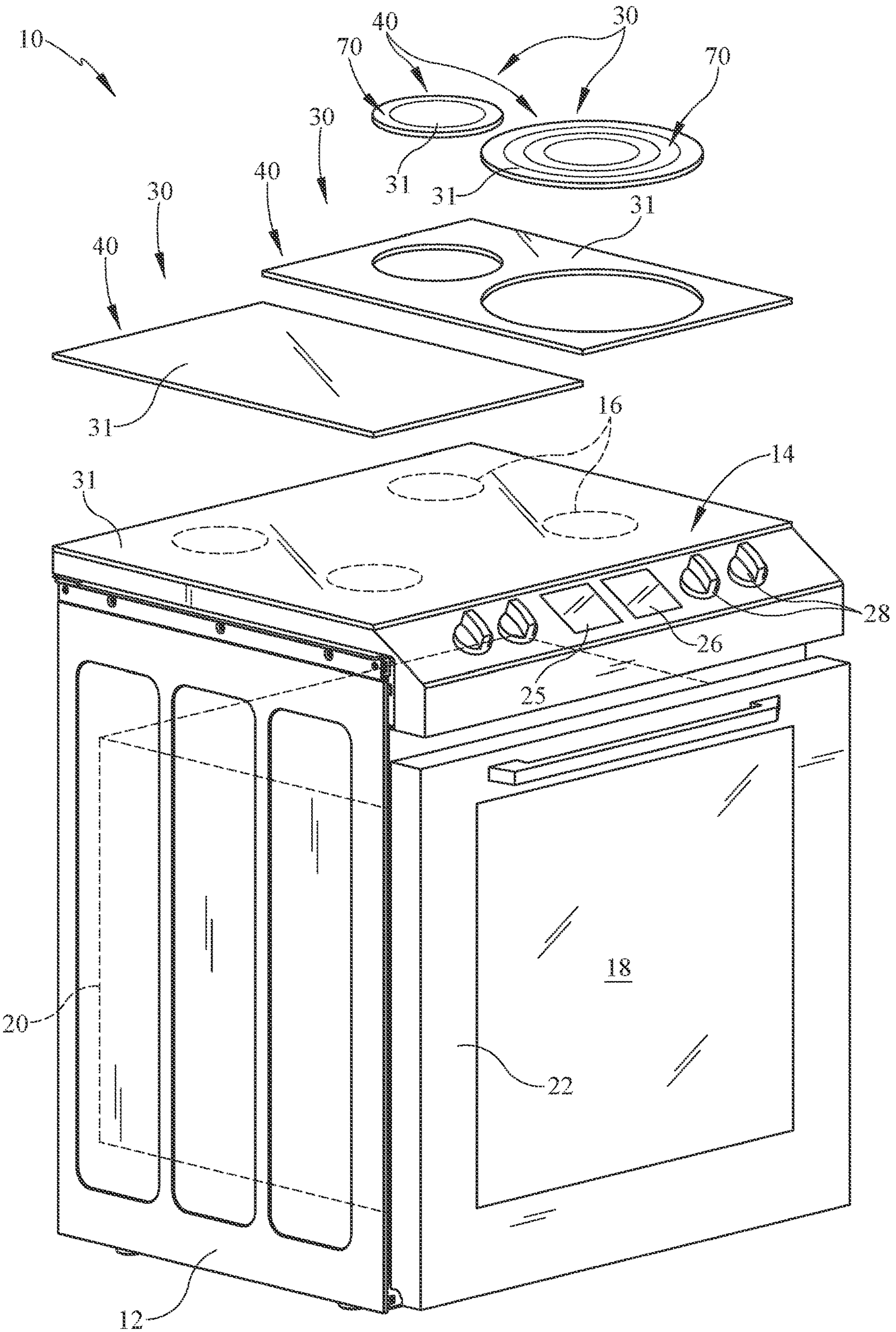
FIG. 4 is a perspective view of the cooking appliance of FIG. 1, illustrating the one or more glass members or cover exploded away from a cooktop.
Figure 5:
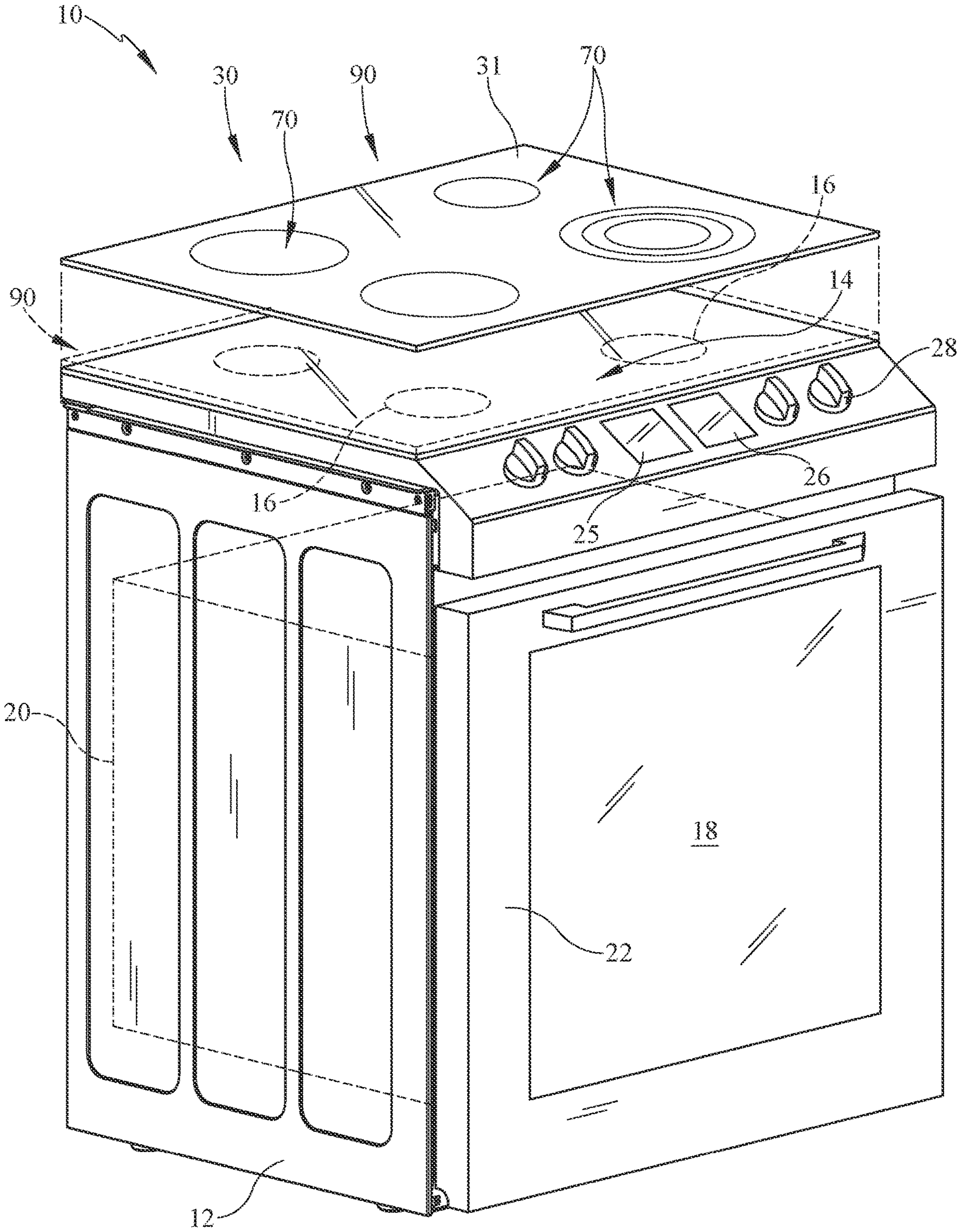
FIG. 5 is a perspective view of the cooking appliance of FIG. 1, illustrating an embodiment of a single glass member or cover exploded away from a cooktop, and illustrating the first configuration disposed over one or more radiant burners in broken lines.
Figure 6:
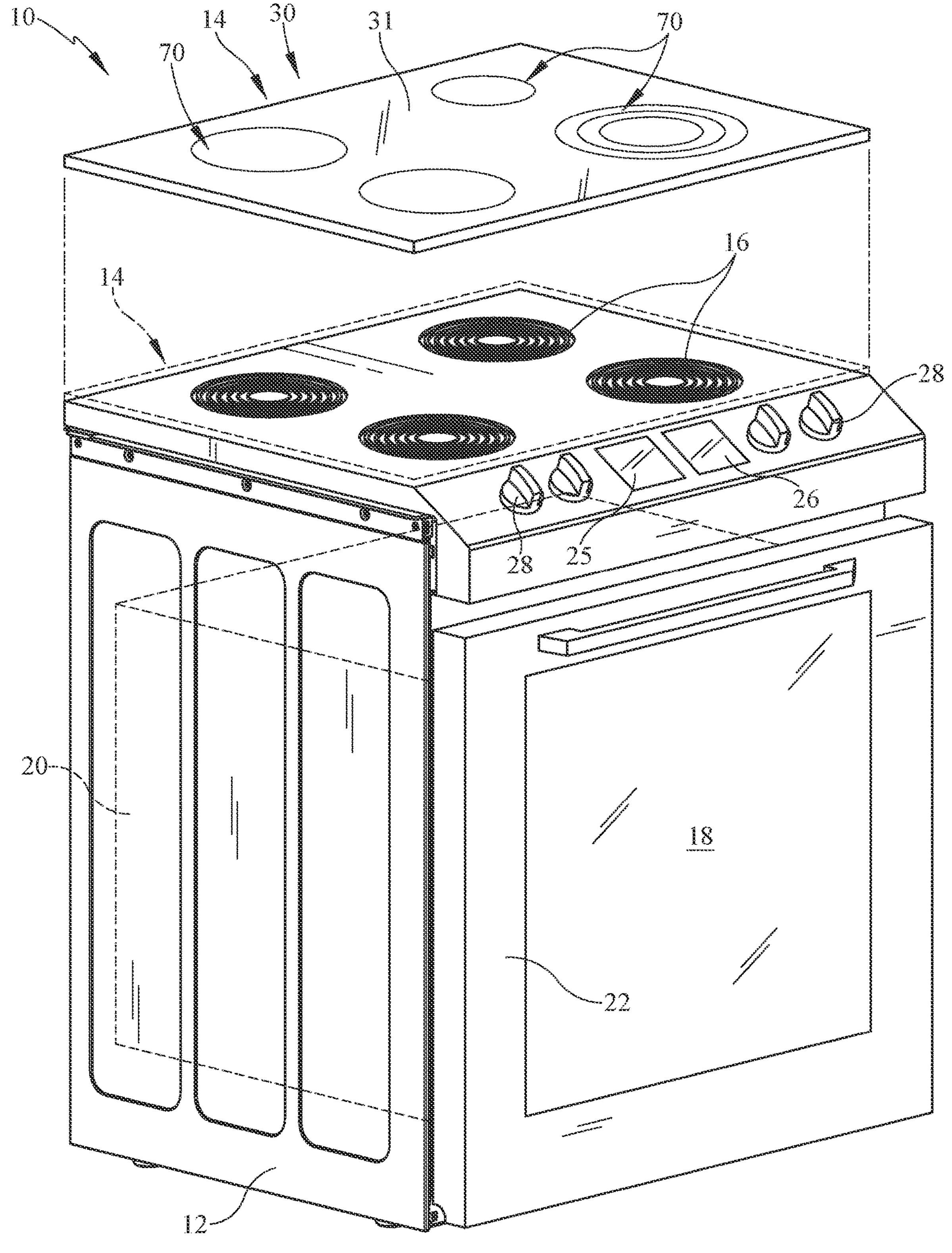
FIG. 6 is a perspective view of the cooking appliance, illustrating an embodiment of one or more glass members or cooktop exploded away from the remaining portion of the appliance, and illustrating the first configuration disposed over one or more radiant burners.
Figure 7:
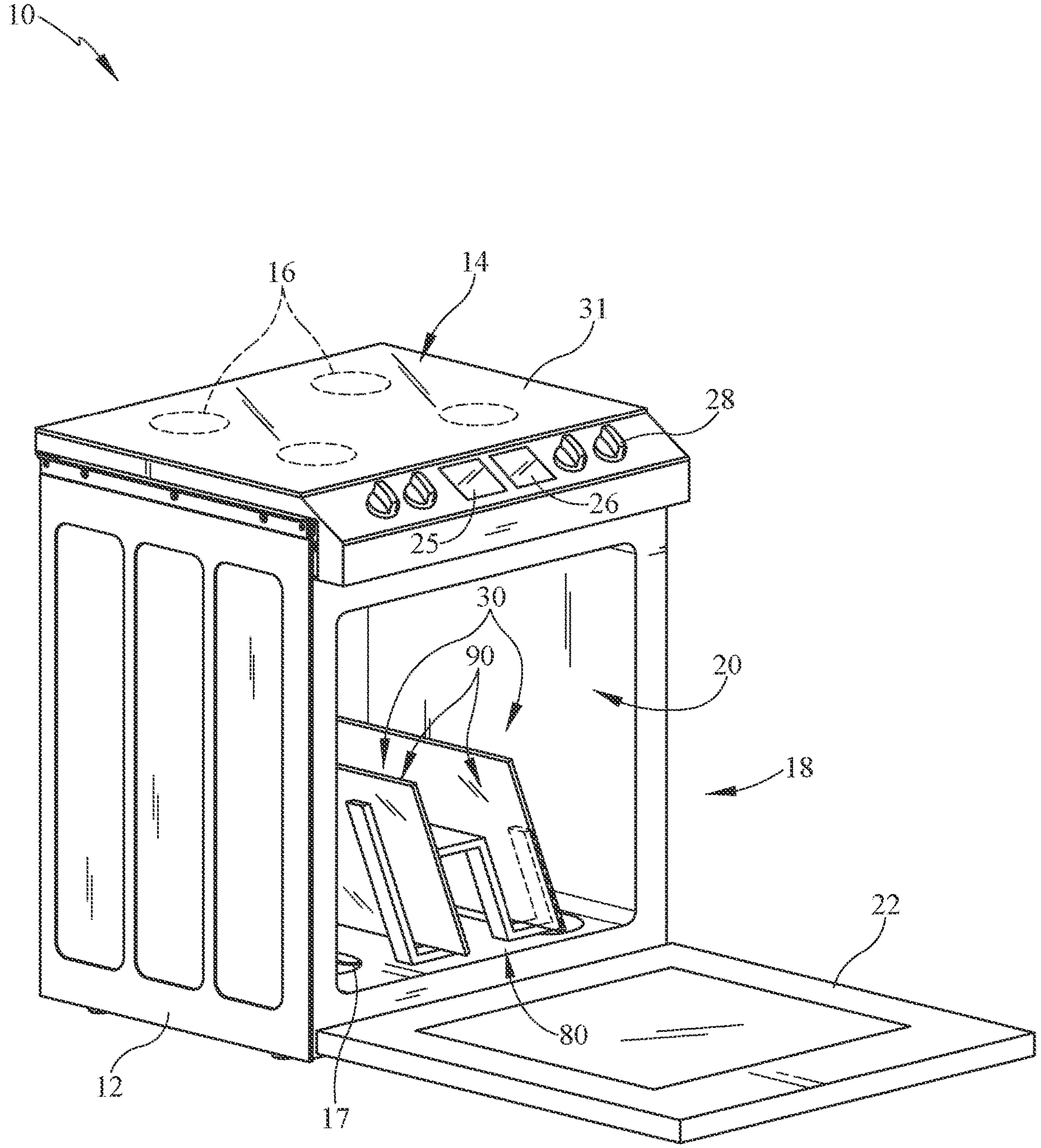
FIG. 7 is a perspective view of the cooking appliance, illustrating the one or more glass members (e.g. one or more covers, one or more cooktop portions) disposed in the oven cavity in a second configuration, and the one or more glass members positioned on one embodiment of the one or more stands.
Figure 8:
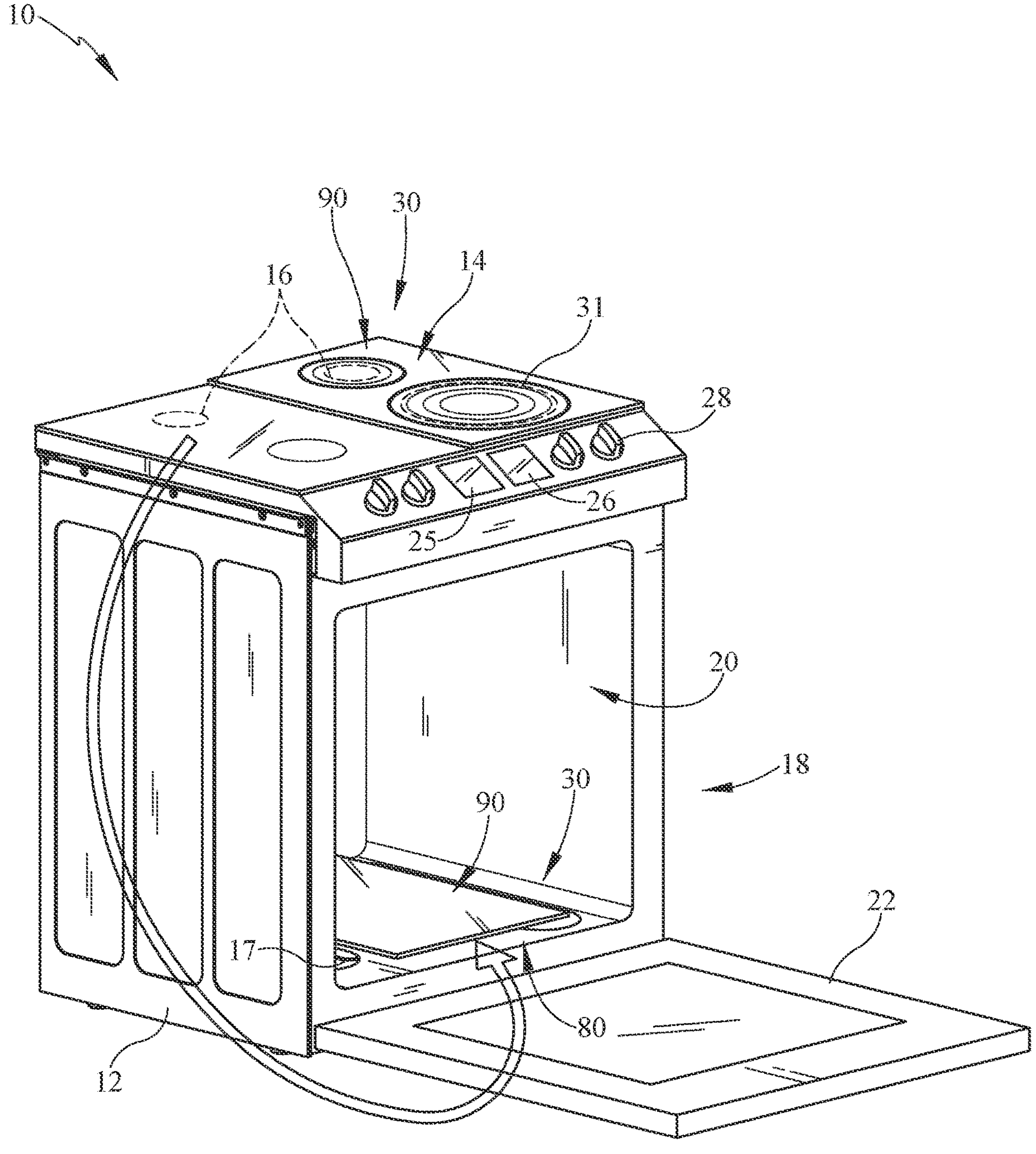
FIG. 8 is a perspective view of the cooking appliance, illustrating the one or more glass members (e.g. one or more covers, one or more cooktop portions) disposed in the oven cavity in a second configuration, and the one or more glass members positioned on one or more surfaces/walls of the cooking cavity.

Turning to the Figures, the cooking appliance may include one or more glass members 30 that may be pyrolytically cleaned within the cooking cavity 20. The one or more glass members 30 may include or define a cooktop surface 31 for placement/heating of the cooking utensil(s) (e.g. pots, pans, etc.). When the one or more glass members 30 become dirty/soiled, the user may position the one or more glass members 30 within the cooking cavity 20 and cleaned by pyrolytic heating of the glass member(s) and materials thereon. The one or more glass members 30, with the cooktop surface(s) 31, may by one or more covers 90 disposed over at least a portion of the cooktop 14 or over the one or more burners 16 (e.g. in a first configuration) in some implementations as shown in FIGS. 1, 4, 5, 7 and 8. In various implementations, the one or more glass members 30 may be at least a portion of the cooktop 14 disposed over the one or more burners 16 as shown in FIG. 6. The cooktop 14 may be one or more portions or members. The one or more glass members 30 (e.g. cover 90 and/or cooktop 14, or portions thereof) may be made of a variety of materials such as, but is not limited to, ceramic glass or materials having low thermal expansion. The one or more glass members 30 may be a of shapes, sizes, quantities, and constructions and still be within the scope of the invention. One or more glass members 30 may interlock or fit together to cover the cooktop surface 31 or surface area, or portion thereof, of the cooktop 14, or in some embodiments define the cooktop 14 itself. For example, as shown in FIGS. 1, 4, and 8, the one or more covers 90 or one or more glass members 30 may be a plurality of glass members 30 with a variety of shapes/sizes (e.g. round, rectangular, etc.) assembling to provide at least a portion of the cooktop surface 31. For example, the glass member(s) may include a variety of inner peripheries and/or outer peripheries in some embodiments. Further, as shown in FIGS. 5 and 6, a single glass member 30 may be used for the cover 90 and/or cooktop 14 in some embodiments. Although not shown, the cooktop 14 may be a plurality of glass members 30. Although the one or more glass members 30 or cover 90 is shown disposed over substantially the entire surface of the cooktop, it should be understood that the glass member(s) or cover may be disposed over a portion of the cooktop 14 (e.g. burner, cooktop surface of the cooktop) in the first configuration. Although glass members are shown being used as either covers or cooktops separately in an appliance, both covers and the cooktop 14 may be glass members used in a single appliance that may be pyrolytically cleaned. The glass member(s) may have graphics (e.g. designs, instructions, shapes, pictures, etc.) or no graphics in some embodiments. The one or more glass members may be transparent, opaque, or translucent in some embodiments. In some embodiments, the glass members may be reversible (e.g. cooktop surfaces on both sides, cook on both sides, different graphics on both sides, graphics on one side).

In some implementations, the one or more glass members 30 (e.g. one or more portions of the cover and/or cooktop) may be positionable between two or more configurations relative to the cooking appliance. The one or more glass members 30 may be positioned between at least a first configuration and a second configuration as shown in the one embodiment. As shown in FIGS. 1 and 8 and in the broken lines in FIGS. 5 and 6, the one or more glass members 30 (e.g. cover 90 and/or cooktop 14) are in a first configuration. In the first configuration, the one or more glass members (e.g. cover and/or cooktop) may be disposed over the one or more burners 16 (e.g. electric). In the first configuration, one or more utensils (e.g. pots, pans, etc.) may be heated on the cooktop surface 31 of the glass members 30 (e.g. cooktop 14 and/or cover 90). As shown in FIGS. 7 and 8, the one or more glass members 30 (e.g. cover 90 and/or cooktop 14) are in a second configuration. In the second configuration, the one or more glass members 30 (e.g. cover and/or cooktop) may be disposed or positioned within the oven cavity 20. In the second configuration, the one or more glass members may be heated (e.g. pyrolytic glass member-clean cycle) in the cooking cavity to clean the surfaces by incinerating or reducing to ash the food/cooking materials, etc. One or more pyrolytic glass member-clean cycles may be used to heat/clean the one or more glass members 30 in the second configuration. When in the second configuration within the cooking cavity, heat from the one or more cooking elements 17 within the cooking cavity 20 may be distributed across (e.g. evenly) the one or more surfaces of the glass member(s) and/or distributed to the material/body (e.g. entire, uniformly) of the glass member(s). The one or more glass members may be uniformly heated when performing the pyrolytic glass member-clean cycle. In some embodiments, the one or more glass members 30 may be spaced away from the one or more cavity walls defining the cooking cavity. The spacing from the cavity walls may allow for better heating of the one or more glass members in the cooking cavity.

In some implementations, the cooking appliance or glass member(s) may include one or more stands 80. The stands 80 may position one or more glass members 30 (e.g. one or more portions of a cover and/or cooktop) within the cooking cavity 20 when the one or more glass members are in the second configuration and/or performing the pyrolytic glass member-cleaning cycle. In the one embodiment shown in FIG. 8, a stand is not used to position the one or more glass members 30 in the second configuration and/or performing the cleaning. The stand 80 may be made of or coated with an enamel. In some embodiments, one or more oven racks may be removed (as shown in FIG. 7) from the cooking cavity 20 to position the one or more stands 80, if used, and/or the one or more glass members 30 into the cooking cavity in the second configuration. In other embodiments, the one or more oven racks may not need to be removed. The one or more stands 80 may space the one or more glass members from the cavity walls of the cooking cavity and/or each other member(s) to allow heat to surround the glass member(s). The stands may have one or more receiving slots/locations to receive one or more glass members. In the one embodiment shown, the one or more stands are removable from the cavity. In some embodiments, the stand(s), or portions thereof, may be fixed or a portion of the cooking cavity (e.g. walls).

Figure 3:
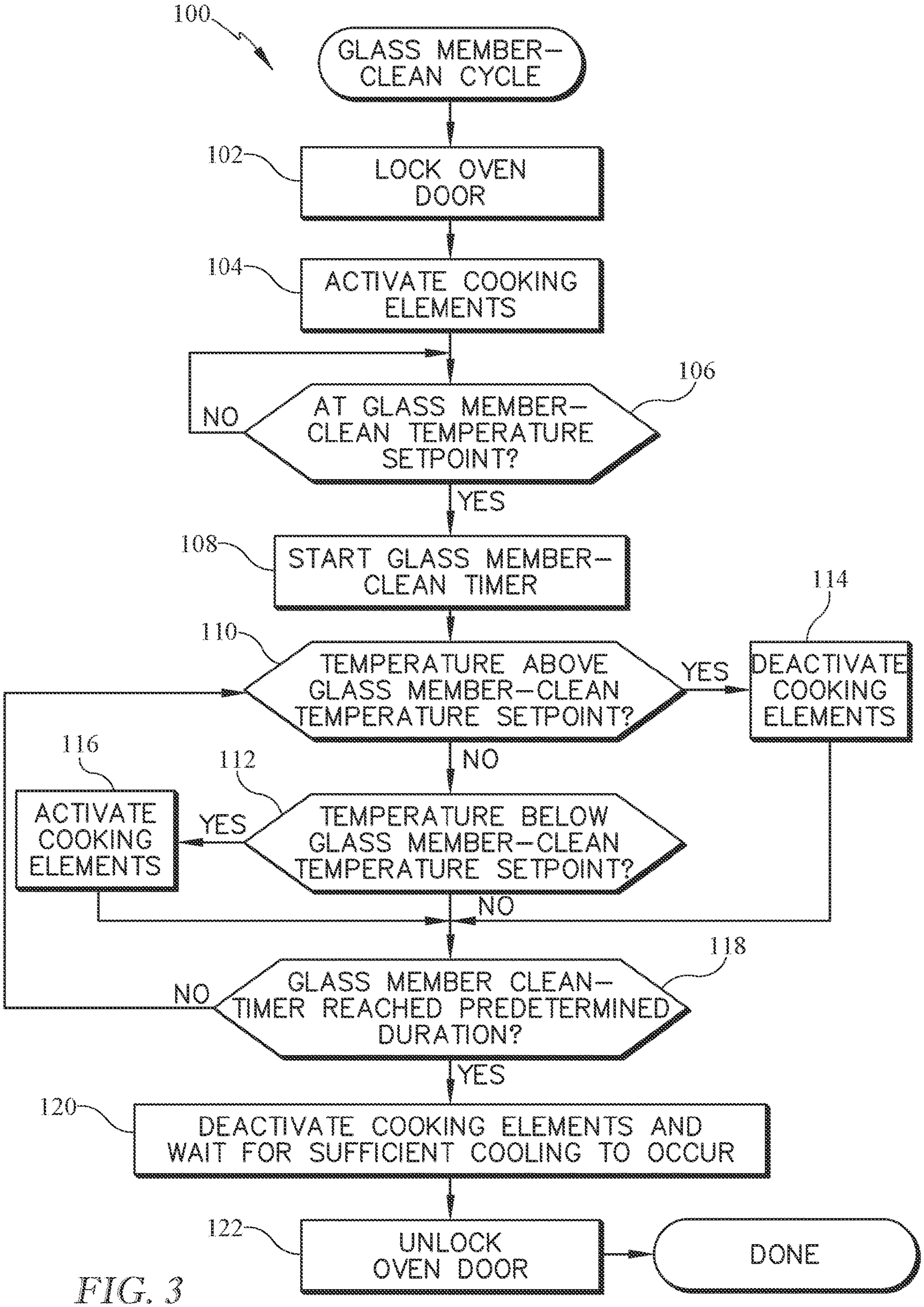
FIG. 3 is a flowchart illustrating an example sequence of operations for performing a pyrolytic glass member-clean cycle using the cooking appliance of FIGS. 1-2.

Now turning to FIG. 3, controller 42 of cooking appliance 10 may implement a sequence of operations 100 for a glass member-clean cycle (e.g. pyrolytic) that may be selected by a user to clean the one or more glass members 30. A pyrolytic glass member-clean cycle is generally performed at close to the maximum achievable oven temperature over a duration of multiple hours, and is generally limited by both the maximum heating energy available from the cooking elements as well as the heat losses incurred by the appliance. For example, on some cooking appliances the target pyrolytic glass member-clean temperature is around 800 degrees Fahrenheit, while the maximum achievable oven temperature is around 900 to 1000 degrees Fahrenheit. The target temperature may be in the range of about 750 degrees Fahrenheit to about 900 degrees Fahrenheit. A pyrolytic glass member-clean cycle may be generally initiated in response to user input, and may be initiated on a delayed basis in some instances. It will be appreciated that the sequence of operations discussed hereinafter is merely one embodiment of the pyrolytic glass member-clean cycle, and has been simplified for the purposes of this disclosure. Additional operations, as well as differences in the timing and/or ordering of different operations, may vary in other pyrolytic glass member-clean cycles (e.g., in terms of when the timer is started, when doors are locked/unlocked), so the invention is not limited to the particular sequence of operations for the pyrolytic glass member-clean cycle described herein.

At the start of the cycle (block 102), the oven door 22 is locked either automatically or manually, and one or more of the cooking elements 17 for the oven are activated (block 104), typically at maximum output power if a variable output power is supported. The one or more cooking elements 17 are regulated to maintain the temperature within the oven cavity proximate at least one glass member-clean temperature setpoint. The air temperature within the oven cavity 20 is then monitored using a temperature sensor (block 106) until the target pyrolytic glass member-clean temperature setpoint is reached. Once the temperature setpoint is reached, control then passes to block 108 to start a timer and initiate a clean phase of the cycle, and blocks 110 and 112 then monitor the air temperature to maintain the temperature within the oven cavity proximate the target pyrolytic glass member-clean temperature setpoint. Thus, for example, if the temperature rises above the glass member-clean temperature setpoint (which may or may not include an offset or threshold to minimize cycling), block 110 passes control to block 114 to deactivate the cooking elements. Likewise, if the temperature falls below the glass member-clean temperature setpoint (which may or may not include an offset or threshold to minimize cycling), block 112 passes control to block 116 to deactivate the cooking elements. As such, the controller maintains the temperature within the oven cavity within a narrow range around the target glass member-clean temperature setpoint.

Block 118 then periodically checks if the self-clean timer has reached a predetermined duration for the clean phase (e.g., generally in the range of about 2 to about 2.5 hours and/or less than an oven self-clean cycle), and if not, returns control to block 110 to continue to regulate or control the cooking elements to maintain the oven cavity temperature proximate the target glass member-clean temperature setpoint. If the duration has been reached, however, block 118 passes control to block 120 to initiate a cooling phase by deactivating the cooking elements and waiting for sufficient cooling to occur (e.g., after a predetermined duration or after the oven cavity temperature falls below a predetermined threshold). The oven door is then unlocked (block 122), and the pyrolytic glass member-clean cycle is complete.

In some implementations, the cooking appliance may include an oven self-clean cycle that may be selected by the user to clean the oven cooking cavity. The self-clean cycle may be included with an appliance, alone or in combination with a pyrolytic glass member-clean cycle. In some implementations, the oven self-cleaning cycle may be used to clean the one or more glass members, instead of a glass member-clean cycle. The oven-self clean cycle, if used, may be different than the pyrolytic glass member-clean cycle in duration and/or temperature of the cooking cavity. For example, the oven-self clean cycle may require a longer duration at substantially the same temperature of the glass member-clean cycle. Performing the self-clean cycle may clean both the oven cavity walls and the one or more glass members if positioned in the second configuration. Alternatively, when the glass member-self clean cycle is performed, the oven cavity walls may not be cleaned or food material incinerated (e.g. fully, as desired) on the cavity walls although the material on the glass members may be incinerated. One embodiment of a self-clean cycle may be found in U.S. Pat. No. 11,009,238 of which is incorporated by reference in its entirety.

In use, the user may determine when the cooktop surfaces of one or more glass members 30 (e.g. one or more covers 90 and/or cooktop 14) in the first configuration are dirty and/or desires to clean (e.g. pyrolytically) the one or more glass members. The user may open the door 22 to the cooking cavity 20 and remove the oven racks in some embodiments. The one or more stands 80, if used, may be positioned within the cooking cavity 20 (e.g. bottom wall). In some embodiments, excess food materials may be washed off the one or more glass materials 30 before performing the pyrolytic glass member-clean cycle. The user removes the one or more glass members 30 (e.g. cover(s) and/or cooktop(s)) from the first configuration and inserts/positions into the opened cooking cavity to the second configuration and onto the one or more stands, if used. When in the second configuration, the user may close the door to the cooking cavity 20. The oven door may be locked (e.g. manually or automatically). The user may initiate the pyrolytic glass member-clean cycle with a user input to the controls/user interface. Once a temperature setpoint is reached, a timer or timeframe at a predetermined temperature may be completed. The surfaces of or the body of the one or more glass members 30 may be uniformly heated during the glass-member clean cycle. When performing the glass member-clean cycle the food/cooking materials thereon may be incinerated. The oven door is unlocked (e.g. automatically or manually). The oven door may unlock, when the temperature of the cooking cavity falls or is sensed below a predetermined threshold. The user may return/remove the one or more glass members (e.g. one or more portions of the cover and/or cooktop) from the second configuration within the cooking cavity back to the first configuration disposed over the cooktop and/or one or more burners, or another location (e.g. storage). For example, once the one or more glass members has reached a temperature to handle. In some embodiments, the one or more glass members may be washed after the glass member-clean cycle. For example, to wash off or remove incinerated food/cooking material on the one or more cooktop surfaces of the glass member(s).

In some implementations, the cooking appliance 10 may not include an oven self-cleaning cycle and/or reach oven temperatures above about 500 degrees Fahrenheit to about 600 degrees Fahrenheit and still be within the scope of the invention to clean one or more glass members 30 (e.g. one or more portions of the cover and/or cooktop). As shown in the one embodiment in FIG. 8, the cooking appliance 10 may not include an oven self-cleaning cycle. Moreover, the cooking appliance may not include a locking mechanism for the cooking cavity 20. The one or more glass members 30 may be inserted into the cooking cavity 20 and heated for one or more durations of time to clean the one or more glass members 30. As shown in the one embodiment, the glass member 30 or cover 90 may be positioned (e.g. horizontally) in contact with (e.g. direct) or adjacent at least the bottom wall of the cooking cavity 20 in the second configuration. FIG. 8 illustrates one embodiment without the use of a stand 80 within cooking cavity 20 to position the one or more glass members 30 onto or in contact with one or more walls (e.g. bottom wall) of the cavity 20. Alternatively, a stand may be used in some embodiments. The glass member(s) may be positioned directly above or over the cooking elements 17. In the second configuration, at least one temperature (e.g. maximum temperature limit of the oven, temperature setpoint) may be selected. The one or more cooking elements 17 may heat the one or more glass members 30 to incinerate the food/cooking material thereon. An increased temperature or range of temperatures (e.g. an increase of about 100 to about 200 degrees) above the oven temperature (e.g. setpoint and/or maximum temperature limit) of the cooking cavity 20 may heat or be applied to the one or more glass members due to the close proximity to the heating elements. For example, the glass member(s) may be heated to about 700 degrees Fahrenheit for an oven cavity temperature set to about 550 degrees Fahrenheit.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A cooking appliance, comprising:

a housing including an oven cavity, one or more electric burners, and a cooktop having one or more cooktop surfaces disposed over the one or more electric burners;

a cover having one or more glass members positionable between a first configuration wherein the one or more glass members are disposed over both the one or more electric burners and the one or more cooktop surfaces of the cooktop and a second configuration wherein the one or more glass members of the cover are disposed within the oven cavity;

a temperature sensor configured to sense an air temperature within the oven cavity;

one or more electric cooking elements configured to generate heat within the oven cavity; and a controller in communication with the temperature sensor and configured to control the one or more electric cooking elements to perform a pyrolytic glass member-clean cycle within the oven cavity when the one or more glass members are disposed within the oven cavity in the second configuration, and wherein the controller is configured to control the one or more electric cooking elements to perform an oven self-clean cycle within the oven cavity.

2. The cooking appliance of claim 1 further comprising one or more stands, wherein the one or more stands position the one or more glass members in the second configuration within the oven cavity when performing the pyrolytic glass member-clean cycle.

3. The cooking appliance of claim 1 wherein the cooktop includes one or more second glass members having the one or more cooktop surfaces.

4. The cooking appliance of claim 1 wherein the controller is configured to perform the pyrolytic glass member-clean cycle by regulating the one or more electric cooking elements to maintain the temperature within the oven cavity proximate a pyrolytic glass member-clean temperature setpoint.

5. The cooking appliance of claim 1 further comprising one or more oven racks disposed within the oven cavity, wherein the one or more oven racks are removed from the over cavity when the one or more glass members are in the second configuration.

6. The cooking appliance of claim 1 wherein the one or more glass members are a ceramic glass.

7. The cooking appliance of claim 1 wherein the one or more glass members have one or more graphics.

8. A cooking appliance comprising:

a housing including an oven cavity, one or more electric burners, and a cooktop having one or more first glass members, wherein the one or more first glass members include one or more cooktop surfaces disposed over the one or more electric burners;

a cover having one or more second glass members positionable between a first configuration wherein the one or more second glass members are disposed over both the one or more electric burners and the one or more cooktop surfaces of the first glass members and a second configuration wherein the one or more second glass members and/or the first glass members are disposed within the oven cavity;

one or more electric cooking elements configured to generate heat within the oven cavity to clean the one or more first glass members and/or the one or more second glass members when in the second configuration; and a controller configured to control the one or more electric cooking elements to perform a pyrolytic glass member-clean cycle within the oven cavity when the one or more first glass members and/or the one or more second glass members are disposed within the oven cavity in the second configuration, and the controller configured to control the one or more electric cooking elements to perform a self-clean cycle, wherein the self-clean cycle is different from the pyrolytic glass member-clean cycle.

9. The cooking appliance of claim 8 wherein the pyrolytic glass member-clean cycle is at a higher temperature than the self-clean cycle.

10. The cooking appliance of claim 8 further comprising one or more stands spacing the one or more glass members from one or more cavity walls when in the second configuration.

11. The cooking appliance of claim 8 wherein the one or more second glass members are disposed over at least two of the one or more electric burners.

12. The cooking appliance of claim 8 wherein the one or more second glass members are in direct contact with the one or more first glass members when in the first configuration.

13. The cooking appliance of claim 12 wherein the one or more glass members are positioned horizontally on a bottom wall of the one or more cavity walls.

14. A method of pyrolytic cleaning one or more glass members disposed over one or more electric burners comprising:

providing one or more first glass members in a first configuration disposed over one or more electric burners in a cooktop;

providing one or more second glass members in the first configuration disposed over both the one or more first glass members and the one or more electric burners;

positioning the one or more second glass members in a second configuration in an oven cavity;

sensing a temperature within the oven cavity of a cooking appliance;

with a controller in communication with a temperature sensor, performing a pyrolytic glass member-clean cycle within the oven cavity when the one or more second glass members are disposed within the oven cavity in the second configuration by regulating one or more cooking elements that generate heat within the oven cavity to maintain the temperature within the oven cavity proximate a pyrolytic glass member-clean temperature setpoint; and performing a self-cleaning cycle within the oven cavity different from the pyrolytic glass member-clean cycle.

15. The method of claim 14 further comprising positioning the one or more second glass members on one or more stands within the oven cavity in the second configuration.

16. The method of claim 14 further comprising washing the one or more second glass members at least one of before and/or after performing the pyrolytic glass member-clean cycle.

17. The method of claim 14 wherein the one or more first glass members are a single first glass member.

18. The method of claim 14 wherein the one or more second glass members are disposed over at least two of the one or more electric burners.

19. The method of claim 14 further comprising uniformly heating the one or more second glass members when performing the pyrolytic glass member-clean cycle.

20. The method of claim 14 further comprising incinerating cooking material on the one or more second glass members when performing the pyrolytic glass member-clean cycle.

21. The method of claim 14 further comprising removing one or more oven racks from the oven cavity before positioning the one or more second glass members in the second configuration in the oven cavity.

* * * * *